United States Patent
Stundzia et al.

(10) Patent No.: US 12,323,497 B2
(45) Date of Patent: Jun. 3, 2025

(54) SELECTING MANAGED PROXY IP DEVICES BY GEOGRAPHICAL COORDINATES THEREOF

(71) Applicant: OXYLABS, UAB, Vilnius (LT)

(72) Inventors: Paulius Stundzia, Azuoline (LT); Miroslav Kozlovski, Vilnius (LT)

(73) Assignee: OXYLABS, UAB, Vilnius (LT)

( * ) Notice: Subject to any disclaimer, the term of this patent is extended or adjusted under 35 U.S.C. 154(b) by 0 days.

(21) Appl. No.: 18/371,349

(22) Filed: Sep. 21, 2023

(65) Prior Publication Data

US 2025/0106302 A1    Mar. 27, 2025

(51) Int. Cl.
*H04L 67/56* (2022.01)
*H04L 43/10* (2022.01)
*H04L 67/141* (2022.01)

(52) U.S. Cl.
CPC .............. *H04L 67/56* (2022.05); *H04L 43/10* (2013.01); *H04L 67/141* (2013.01)

(58) Field of Classification Search
None
See application file for complete search history.

(56) References Cited

U.S. PATENT DOCUMENTS

| | | | |
|---|---|---|---|
| 9,444,903 B2 | 9/2016 | Nuaimi et al. | |
| 9,660,895 B1* | 5/2017 | Bennett | H04W 40/20 |
| 11,212,354 B1* | 12/2021 | Pilkauskas | H04L 67/564 |
| 11,381,666 B1* | 7/2022 | Stalioraitis | H04L 67/01 |
| 11,457,073 B1 | 9/2022 | Pilkauskas et al. | |
| 11,470,175 B1 | 10/2022 | Pilkauskas et al. | |
| 11,503,105 B2 | 11/2022 | Rubenstein et al. | |
| 11,553,058 B1 | 1/2023 | Pilkauskas et al. | |
| 11,575,656 B1 | 2/2023 | Pilkauskas et al. | |
| 11,601,518 B1 | 3/2023 | Pilkauskas et al. | |
| 11,677,856 B2 | 6/2023 | Shribman et al. | |
| 2020/0374229 A1* | 11/2020 | Vysotsky | H04L 41/12 |
| 2021/0133272 A1* | 5/2021 | Shribman | H04L 67/563 |
| 2021/0218820 A1* | 7/2021 | Papakostas | H04L 63/1408 |
| 2024/0080243 A1* | 3/2024 | Kozlovski | H04L 43/50 |
| 2024/0171640 A1* | 5/2024 | Dagys | H04L 67/141 |

* cited by examiner

*Primary Examiner* — Ranodhi Serrao
(74) *Attorney, Agent, or Firm* — Sterne, Kessler, Goldstein & Fox, P.L.L.C.

(57) ABSTRACT

This invention discloses selecting a proxy IP device (Proxy-ICDAPIA) by its geographical coordinates and distance from the target web service. A method and system are disclosed, allowing users to specify Proxy-ICDAPIAs by geographic coordinates. Embodiments describe the Proxy-ICDAPIA selection using Geohash areas, and from circular geographical areas specified by center coordinates and a radius. Proxy-ICDAPIAs are selected in areas where geographic density of web services is high, and selecting Proxy ICDAPIAs by country/city may be insufficient. Another problem solved when a client uses Proxy ICDAPIAs selection by coordinates, is an inability to provide a country code. The aforementioned functionality does work without a specified country code, some countries are not included in the pool used when no parameters are provided. This solution allows creating GeoHash pools, then encoding the client's provided coordinates into its own GeoHash to determine the containing Proxy-ICDAPIAs that match the specified coordinates.

18 Claims, 6 Drawing Sheets

SELECTING MANAGED PROXY IP DEVICES BY GEOGRAPHICAL COORDINATES THEREOF

FIELD OF INVENTION

The invention relates to managed Internet proxy services and implementations thereof. Specifically, the invention discloses a method and system for selecting a Proxy-Internet Capable Device with Assigned Public IP Address (Proxy-ICDAPIA) as the appropriate proxy IP devices to access an internet target web service. The Proxy-ICDAPIA is selected by specifying geographic location coordinates in the user's request, selecting the Proxy-ICDAPIA by its precise geographical location and the distance from the target Web service.

BACKGROUND

Proxy servers generally act as intermediaries for requests from clients seeking content, services, and/or resources from target servers (e.g., web servers) on the internet. For example, a client may connect to a proxy server to request data from another server. The proxy server evaluates the request and forwards the request to the other server containing the requested data. In the forwarded message, the source address may appear to the target to be not the client, but the proxy server. After obtaining the data, the proxy server forwards the data to the client. Depending on the type of request, the proxy server may have full visibility into the actual content fetched by the client, as is the case with an unencrypted Hypertext Transfer Protocol (HTTP) session. In other instances, the proxy server may blindly forward the data without being aware of what is being forwarded, as is the case with an encrypted Hypertext Transfer Protocol Secure (HTTPS) session.

To interact with a proxy server, the client may transmit data to the proxy server formatted according to a proxy protocol. The HTTP proxy protocol is one example of how the proxy protocol may operate. HTTP operates at the application layer of the network stack (layer 7). In another example, HTTP tunneling may be used, using, for example, the HTTP CONNECT command. In still another example, the proxy may use a SOCKS Internet protocol. While the HTTP proxy protocol operates at the application layer of the OSI (Open Systems Interconnection) model protocol stack, SOCKS may operate at the session layer (layer 5 of the OSI model protocol stack). Other protocols may be available forwarding data at different layers of the network protocol stack.

Proxy servers, however, do more than simply forward web requests. In some instances, proxy servers can act as a firewall, act as a web filter, provide shared network connections, and cache data to speed up common requests. Proxy servers can also provide privacy and can control internet usage of employees and children. Proxies can also be used to bypass certain internet restrictions (e.g., firewalls) and to circumvent geo-based content restrictions. For example, if a client requests content from a webpage located on a webserver in one country, but the client's home country does not allow access to that content, the client can make the request through a proxy server that contacts and retrieves the content, thereby concealing the location of the target server. Proxy servers can also be used for web scraping, data mining, and other similar tasks. A proxy server changes the request's source IP address, so the web server is not provided with the geographical location of the scraper. Using the proxy server makes a request appear more organic and thus ensures that the results from web scraping represents what would actually be presented were a human to make the request from that geographical location.

Proxy servers fall into various types depending on the IP (Internet Protocol) address used to address a web server. A residential IP address is an address from the range specifically designated by the owning party, usually Internet service providers (ISPs), as assigned to private customers. Usually a residential proxy is an IP address linked to a physical device, for example, a mobile phone or desktop computer. Blocks of residential IP addresses may be bought from the owning proxy service provider by another company directly in bulk. Mobile IP proxies are a subset of the residential proxy category. A mobile IP proxy is one with an IP address that is obtained from mobile operators. A datacenter IP proxy is the proxy server assigned with a datacenter IP. Datacenter IPs are IPs owned by companies, not by individuals.

Many service providers across the Internet provide services to consumers, and hence are configured to block, or require additional verification (such as CAPTCHAS), when they receive requests originated from data centers. Residential and mobile IP proxies may be advantageous over data center proxies because, to the target website, requests from these proxies appear to originate from consumers.

Exit-node proxies, or simply exit-nodes (the term as known from prior art), are gateways where the traffic hits the Internet. There can be several proxies used to perform a user's request, but the exit-node proxy is the final proxy that contacts the target and forwards the information from the target to a user device, perhaps via a previous proxy. There can be several proxies serving the user's request, forming a proxy chain, passing the request through each proxy, with the exit-node being the last link in the chain that ultimately passes the request to the target.

Other patent documents disclose that geolocation of a proxy exit-node is defined only by a country and/or city (country-city code) where the proxy exit-node is allocated. However, no other methods/attributes/means for defining and selecting the proxy exit-node by geolocation are disclosed therein.

SUMMARY

Systems and methods herein provide a proxy infrastructure and managed service.

The proxy service infrastructure comprises a plurality of Internet Capable Devices with Assigned Public IP Address-ICDAPIA entities/devices—in this invention, the ICDAPIAs are configured to operate as Proxy-ICDAPIAs 130, through which a target web service 132 can be reached. A Public IP address is an address on the public Internet, as opposed to a strictly private subnet. The Public IP address can be assigned through use of Network Address Translation (NAT) at, for example, a router. In this way, even devices connected to a private subnet can be ICDAPIAs. The term Proxy-ICDAPIAs 130 also covers the function of so-called proxy exit-nodes, or simply exit-nodes, known from prior art. Such Proxy-ICDAPIA by its broadest sense and function, can be any specific device in the Internet having a public Internet address, which can be accessed, and through which an access from other Internet devices and exit to the target 130 is possible. Proxy-ICDAPIA can be a third party proxy, proxy-exit node, server, mobile device, smart device, or any other device having the function of Proxy-ICDAPIA.

In the present invention, no restriction shall be applicable on selecting a particular type of such Proxy-ICDAPIA device.

A connection is established with a plurality of Proxy-ICDAPIAs of the proxy infrastructure. At one of a plurality of network elements (e.g., Proxy Service Agent units, abbr. Proxy-SA units, or PSA units, or PSA) of the proxy infrastructure, a proxy protocol request is received directly from a client computing device (i.e., user's request). In response to the proxy protocol request, one of the plurality of Proxy-ICDAPIAs is selected. Finally, a connection is established with the target web service through the one Proxy-ICDAPIA selected from the plurality of Proxy-ICDAPIAs of the proxy infrastructure.

This invention discloses a method and system for selecting a Proxy-ICDAPIA by its geographical coordinates in relation to the target web service. The invention is applicable and more efficient in cities, urban and metropolitan areas, where many web services and Proxy-ICDAPIAs as proxy service exit-nodes may be operating within a city area, and therefore, selecting the Proxy-ICDAPIA by city name only is not sufficient. A lot of Proxy-ICDAPIAs may be allocated within a city or metropolitan area. Selecting the Proxy-ICDAPIA by the country-geographic indicators is not sufficient, as some city/metropolitan areas may have 20 or 50 miles in radius. Therefore, more precise and detailed selection of Proxy-ICDAPIAs is required. A possible solution may be to subdivide the city or metropolitan area into its smaller areas (city districts). However, this selection may be too sophisticated to a user as he should know these smaller geographical areas (district) and their names within the larger metropolitan area.

Another solution, disclosed by the present invention, is to select proxy ICDAPIA devices by specifying their geographical coordinates. In such proxy service, the user in his request for proxy service defines the geographical coordinates of the area from which he intends to find the most appropriate Proxy-ICDAPIA for his service. The geographic coordinates can be used either independently, or together with the country and city identifiers. The geographic coordinates of a Proxy-ICDAPIA are not limited to be selected in a variety of geolocation systems and their different formats.

In a first embodiment (aspect), the Geohash is used which is a unique identifier of a specific region on the Earth. The concept of the Geohash is that the Earth is divided into regions of user-defined size and each region is assigned a unique identifier (id), which is called its Geohash. For a given location on the Earth, the Geohash algorithm converts its latitude and longitude into a string. This string then is used in the user's request to specify the geographic area from which an available Proxy-ICDAPIA is selected for proxy service. The selected Geohash area and its code can be generated in Geohash viewers, for example, https://geohash.softeng.co/. In the first embodiment, the geographic area where a preferred Proxy-ICDAPIA is selected from, is specified by its Geohash string in the user's request. Whether there are no available Proxy-ICDAPIA in the specified Geohash area, then an upper Geohash level or neighboring Geohash areas of the same level around the user specified Geohash area may be checked, and an available Proxy-ICDAPIA selected from them. These Geohash areas (cells) can be defined as the nearest GeoHash within provided GeoHash deviation tolerance. The algorithm implementing the method of a Proxy-ICDAPIA selection, comprises steps and software modules configured to resolve the Proxy-ICDAPIAs falling into the user's specified and neighboring Geohash areas, and provide the result which can be either one of:

- searching is done for suitable Proxy-ICDAPIAs within the list of available Proxy-ICDAPIAs, and one Proxy-ICDAPIA of the detected suitable Proxy-ICDAPIAs is randomly selected, and further is used to perform the user's request for proxy service: the proxy service to the client's device is provided by the Proxy-Service-Agent (proxy infrastructure component), providing to the client's device a connection and further communication through the selected Proxy-ICDAPIA to the target web service;
- as an option in the above, instead of a random selection, further parameters (e.g., throughput, Quality of Service (QOS)) of the more than one detected Proxy-ICDAPIAs may be indicated, for the user's selection of the preferred Proxy-ICDAPIA;
- terminate the user's request if no suitable Proxy-ICDAPIAs were detected within the specified Geohash area or areas: for example, by HTTP response status code 502;
- if no suitable Proxy-ICDAPIAs were detected within the specified Geohash area or areas—as an option, a nearest available Proxy-ICDAPIA from any neighboring Geohash area is returned, indicated by the Geohash string of that neighboring area.

In a second embodiment (aspect), the user's selected geographical area can be defined by a central point coordinates X, Y, and a radius R around this central point. In this embodiment, the user's request line for a proxy service comprises these three geo-parameters: central point coordinates X, Y, and the radius R around this central point. The Proxy-ICDAPIA is selected from the area described by the radius R. If more than one Proxy-ICDAPIA is found in this area, one of them is selected randomly from the available group. Another option is that a list of available Proxy-ICDAPIAs are provided to the user and the user can further select any of them, either randomly, or using further criteria, such as available throughput, Quality of service, etc.

In a third embodiment, the Proxy-ICDAPIAs is selected from a geographical area specified by its central point coordinates X,Y, and two radii R and R2 around this central point X, Y. The user's request line for a proxy service comprises the same 3 geo-parameters: central point coordinates X, Y, and the accuracy radius R within which any available Proxy-ICDAPIAs shall be searched. Another radius R2 is an optional minimum allowable, or an exclusion radius. The radius R2 may be defined either by the user, as the additional geo-parameter in the user's request line. Otherwise, R2 may be specified internally by the proxy service/service provider, for example, this minimum radius (exclusion radius) R2 may be related to some legal and privacy regulations, to retain a certain minimum distance from the target web service and its provider. For example, values of those radii R and R2 may be defined as follows: accuracy radius R by the user is defined in the range from 0 to 100 miles, and preferably, it can be R=10 miles. While the additional (exclusion) radius R2 is defined in the range from 0 to 100 miles, and preferably is R2=5 miles. The exclusion radius R2 has to be smaller than the user's selected accuracy radius R, to define a searchable ring-shaped geographical area, within which available Proxy-ICDAPIAs could be searched. The Proxy-ICDAPIA is selected from such a ring-shaped circular area described by the accuracy radius R in the user's request, meanwhile, the Proxy-ICDAPIAs which are closer to the central point X, Y than the allowed minimum radius R2, are eliminated from the search/selection results. The Proxy-ICDAPIAs found in the ring-shaped circular area defined by X, Y, R, R2 are:

- a single Proxy-ICDAPIA and its IP address is selected by the method algorithm randomly from this list, for providing proxy service to the user (client's device).
- In case, more than one suitable Proxy-ICDAPIAs is detected, optionally, further technical criteria (e.g., throughput, OoS) may be provided to the user, for selecting by the user the Proxy-ICDAPIA through which the proxy service will be provided,
- terminate the user's request if no suitable Proxy-ICDAPIAs were detected within the specified ring-shaped circular area (for example, by HTTP response status code 502);

System and computer program product embodiments are also disclosed. For any embodiment of the invention, a proxy infrastructure and Proxy-ICDAPIAs are operated. A network element (e.g., an intermediary Proxy-SA 108) is connected to a plurality of Proxy-ICDAPIAs. At one of a plurality of Proxy-SAs of the proxy infrastructure, a proxy protocol request is received directly from a client computing device (user's request). The proxy protocol request specifies a request and a target. In response to the proxy protocol request, a selection is made between one of the plurality of Proxy-ICDAPIAs. A message with the request is sent from the Proxy-SA to the selected Proxy-ICDAPIAs. Optionally, the request may be sent from the Proxy-SA through an Auxiliary Proxy-SA which controls a group of Proxy-ICDAPIAs, and finally, the message is sent to the selected Proxy-ICDAPIAs to forward the request to the target web service.

In the present invention, the system and computer program further implements computer algorithm steps of the method of selecting a suitable Proxy-ICDAPIA from a plurality of Proxy-ICDAPIAs. The selection is performed at least by any of the above embodiments.

Further, the system and computer program comprises and operates a database of the plurality of Proxy-ICDAPIAs, with their IP addresses. The database comprises a plurality of records for each Proxy-ICDAPIA, where each Proxy-ICDAPIA also comprises its geographical coordinates. The geographical coordinates of each Proxy-ICDAPIA can be represented as a geographical point in any known geo-coordinate system. For the Geohash type representations, the geographical coordinates of each Proxy-ICDAPIA are represented as a Geohash string defining the location up to a certain level of detail. Furthermore, to prove the technical effect of the invention, there should be at least two Proxy-ICDAPIAs in a single city area, both having different geographical coordinates, thereby allowing to select one of them by the geographical coordinates.

Embodiments, features, and advantages of the invention, as well as the structure and operation of these various embodiments, are described in detail below with reference to accompanying drawings.

BRIEF DESCRIPTION OF THE FIGURES

The accompanying drawings, which are incorporated herein and form part of the specification, illustrate the present disclosure and, together with the description, further serve to explain the principles of the disclosure and to enable a person skilled in the relevant art to make and use the disclosure.

FIG. 3A: selecting from a circle-shaped and ring-shaped geographic areas defined by geo-coordinates: central point coordinates X, Y, user's accuracy radius R, and an additionally defined minimum distance radius R2;

FIG. 3B: selecting according to the user's specified geographical area as a Geohash string/level (u99zp7);

FIG. 3C: selecting according to the user's specified geographical area as a Geohash string and level (u99zp7), and the surrounding Geohash areas of the same level, by the accuracy of +1 around the selected area (i.e., accuracy level 2);

FIG. 3D: selecting according to the user's specified geographical area as a Geohash string/level (u99zp7), and the surrounding Geohash area of "−1"-upper level (u99zp);

FIG. 3E: searching for available Proxy-ICDAPIAs in Geohash pools of upper level (level 3), as defined by user's request and Geohash string (level 4). There are 3 selection cases presented in FIG. 3E:

Figure 1:
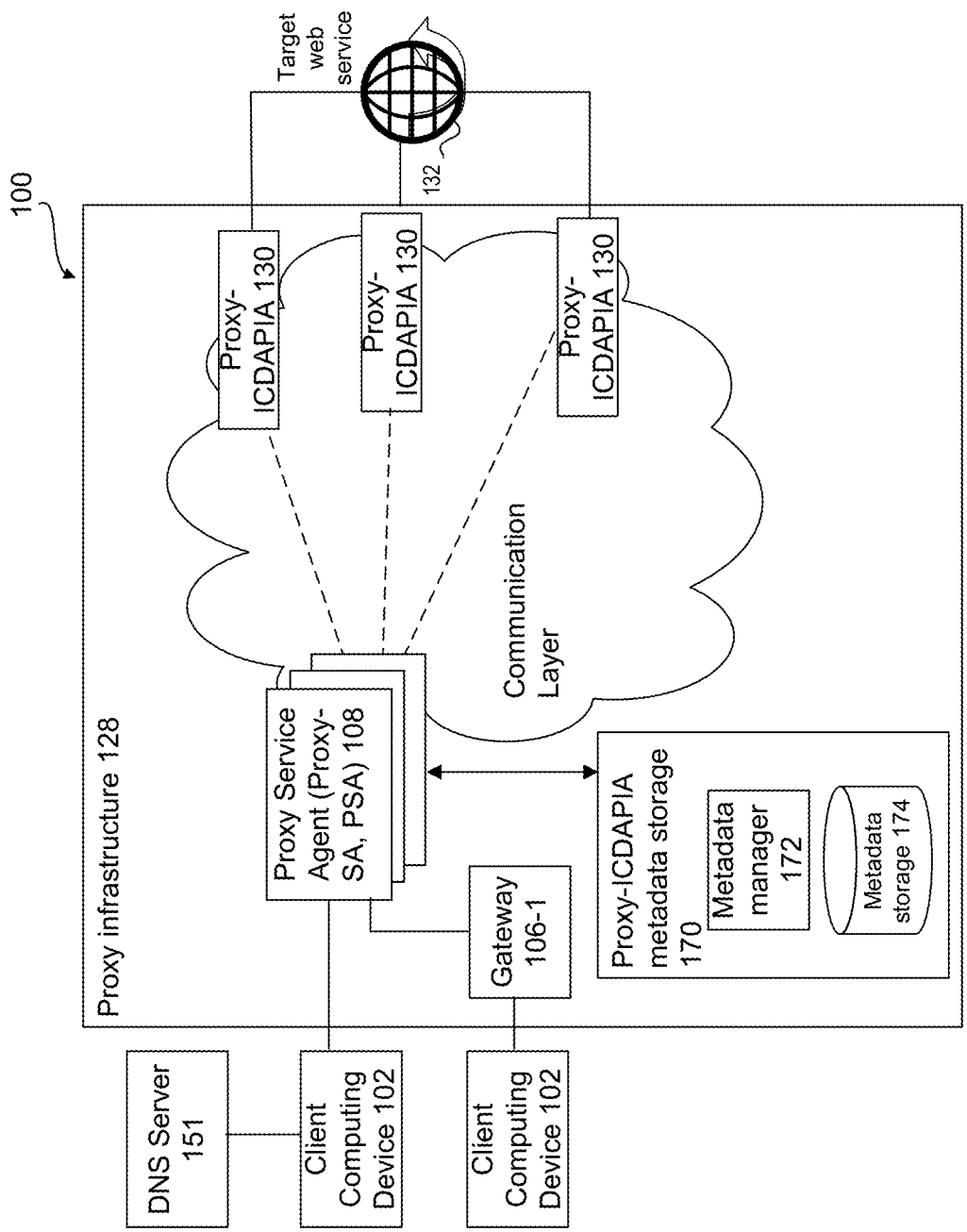
FIG. 1 is a system diagram that illustrates a general proxy infrastructure 128.

Case 1: if in user's request defined coordinates fall into level 4 GeoHash '9w7z', then include into IP-pool available Proxy-ICDAPIAs from level 3 GeoHashes '9w7' (main, always included), and further from '9we', '9ws', and '9wk';

Case 2: if in user's request defined coordinates fall into level 4 GeoHash '9w75', then include into IP-pool available Proxy-ICDAPIAs from level 3 GeoHashes '9w7' (main, always included), and further from '9w6';

Case 3: if in user's request defined coordinates fall into level 4 GeoHash '9w7d', then include into IP-pool available Proxy-ICDAPIAs from level 3 GeoHashes '9w7' (main, always included) only.

FIGS. 4-7 illustrate different various ways on how intermediary Proxy-SA can report information for consumption by a main Proxy-SA 108.

The drawing in which an element first appears is typically indicated by the leftmost digit or digits in the corresponding reference number. In the drawings, like reference numbers may indicate identical or functionally similar elements.

DETAILED DESCRIPTION

The figures and the following description illustrate various exemplary embodiments. It will thus be appreciated that those skilled in the art will be able to devise various arrangements that, although not explicitly described or shown herein, embody various principles of design and/or operation and are included within the scope of the embodiments. Furthermore, any examples described herein are intended to aid in understanding the principles of the embodiments and are to be construed as being without limitation to such specifically recited examples and conditions.

Proxy infrastructure. FIG. 1 depicts a block diagram of a system 100 for providing an internet proxy service. System 100 includes a client computing device 102, proxy infrastructure 128, and a target 132. The embodiments herein are operable to provide an internet proxy (Proxy-ICDAPIA 130) to a client computing device 102 such that the device 102 can retrieve data from, or otherwise exchange data with, another location on the internet (e.g., web servers, devices, etc.). While illustrated with one of these components, there are typically thousands, if not millions, of client computing devices 102 attempting internet proxies (Proxy-ICDAPIAs 130) to other devices and web servers (collectively referred to herein as targets 132) at any given time. And, the number of target web service 132 accessed by the system 100 may also number in the millions. Examples of the target web service 132 include Web servers, endpoint devices used in the Internet of Things (IoT), other client devices (e.g., smart phones, computers, etc.), and the like.

Proxy infrastructure 128 is split into smaller chunks (e.g., services) so that Proxy-ICDAPIAs 130 are not lost during deployments or outages. Each of these components and their subcomponents are described below.

Request for proxy service and its format. Client computing device 102 is a computing device that initiates a request to a target web service 132 through a proxy (Proxy-ICDA-PIA 130). As described above, client computing device 102 may choose to send the request through proxy (Proxy-ICDAPIA 130). In one embodiment, client computing device 102 may be from a customer that is a different entity than the entity that controls and manages proxy infrastructure 128. In another embodiment, client computing device 102 may be controlled by the same entity that manages proxy infrastructure 128. For example, client computing device 102 may be a web scraping system that formats and generates web requests, as specified by a customer.

To initiate the request, client computing device 102 may send a request to a proxy infrastructure 128, and in particular a gateway 106-1 of proxy infrastructure 128, using a proxy protocol. Various proxy protocols may be available. Examples of a proxy protocol include the HTTP proxy protocol and a SOCKS protocol. In another example, HTTP tunneling may be used, using, for example, the HTTP CONNECT command. While the HTTP proxy protocol operates at the application layer of the OSI model protocol stack, SOCKS may operate at the session layer (layer 5 of the OSI model protocol stack). In still another example, a transparent proxy may be used. A transparent proxy, also known as an inline proxy, intercepting proxy, or forced proxy, is a server that intercepts the connection between an end-user or device and the internet. A firewall may intercept the request from client computing device 102 and send it to proxy infrastructure 128.

The proxy protocol message sent from client computing device 102 (user's request) to proxy infrastructure 128 can have various components. The message can include a destination address (e.g., destination IP address) of target 132. The message can include authentication parameters that identify a customer associated with client computing device 102 to proxy infrastructure 128. The message can also include other data needed to request information from target 132. For example, in the case where the message is an HTTP proxy request, the message could include a target path and parameters. Finally, the message can have embedded within it other parameters that signal proxy infrastructure 128 and affect its behavior. For example, the message can have a parameter that indicates a desired location for the proxy (Proxy-ICDAPIA 130) to access target 132 or a session ID indicating a session to use when accessing target 132.

The user's request message also comprises geolocation for selecting the Proxy-ICDAPIAs in a particular geographical location, defined by country (e.g., country code) and city (e.g., city name or code).

The proxy protocol message may be an HTTP CONNECT message as set out below. The HTTP CONNECT message asks a proxy server (otherwise, a Proxy-Service-Agent 108) to establish a TCP connection to the target web service. Once the TCP connection has been established by the server, the proxy server continues to proxy the TCP stream to and from the client. HTTP CONNECT may initiate a TLS (Transport Layer Security) handshake to support an HTTPS connection between client computing device 102 and target 132:

CONNECT example.io HTTP/1.1
Host: example.io
Proxy-Authorization: Basic customer-<Username>-sessionid-123-cc-LT-city-Vilnius: <Password>
Proxy-Connection: Keep-Alive As mentioned above, this example HTTP CONNECT message may be addressed to gateway 106-1 of proxy infrastructure 128 from client computing device 102. The message may instruct proxy infrastructure 128 to forward the CONNECT message to target 132, which, in this example, is addressed at the hostname "example.io." The message indicates the protocol used (e.g., "HTTP/1.1") and has a Proxy-Connection header that is set to "Keep-Alive." The "Keep-Alive" Proxy-Connection header may indicate to proxy infrastructure 128 to provide multiple HTTP requests and responses within a single TCP session.

Embedded in the example proxy authorization header are a username and password. The Proxy-Authorization field has a username and password separated by a colon. While the username and password are illustrated in plain text here for simplicity, a skilled artisan will recognize that they may be encoded in Base64 or other encoding technique. Embedded in the username are session information (in this example, "sessionid-123") and a desired location for the proxy (in this example, Vilnius, Lithuania). Also embedded in the username of the Proxy-Authorization field is a <Username> field identifying the customer associated with client computing device 102. Finally, in the password portion of the Proxy-Authorization credentials, a password associated with the customer may be provided.

Client's gateway. Client computing device 102 may connect to proxy infrastructure 128 through gateway 106-1. The proxy protocol message from client computing device 102 may be addressed to gateway 106-1. The IP address of gateway 106-1 may be resolved using standard Domain Name System techniques. The gateway 106-1 acts as an entry point for proxy infrastructure 128. Alternatively, gateway 106-1 may translate the data to a format used by proxy infrastructure 128 internally to exchange data. To communicate with each other, gateway 106-1 and Proxy-SA 108 (as well as other internal components of proxy infrastructure 128) may use any of various well-known messaging formats, including, but not limited to, TCP, UDP, HTTP(S), HTTP3, QUICK and WebSocket. Further, the gateway 106-1 can enrich an incoming request to add to the message sent to Proxy-SA 108 data that proxy infrastructure 128 uses in processing the proxy request. Furthermore, the gateway 106-1 may act as a load balancer to distribute incoming data between one of several servers running Proxy-SA 108. The gateway 106-1 may be unnecessary and instead, client computing device 102 can communicate directly with Proxy-SA 108 (FIG. 1).

Proxy Service Agents (Proxy-SA units, PSAs). As mentioned above, proxy infrastructure 128 may include multiple Proxy-Service-Agents (Proxy-SAs) 108. When client computing device 102 sends a message to proxy infrastructure 128 may address the message to a DNS address, such as "us.proxy.com." Before sending the message to proxy infrastructure 128, client computing device 102 resolves the DNS address into an IP address. Client computing device 102 resolves the DNS address into an IP address by accessing a DNS server 151. The Domain Name System (DNS) is the hierarchical and decentralized naming system used to identify computers, services, and other resources reachable through the internet or other internet protocol networks. The resource records contained in the DNS associate domain names with IP addresses. DNS server 151 may select between one of several Proxy-SAs 108 available for a DNS address, such as "us.proxy.com," returning one of several possible IP addresses. Client computing device 102 will send the message to the selected IP address. In this way, using the DNS system, DNS server 151 provides load-balancing amongst various Proxy-SAs 108 as described above.

When gateway 106-1 is absent, a Proxy-SA 108 can provide other functions of gateway 106-1 described above. For example, Proxy-SA 108 can convert a proxy protocol message into an internal format. Also, Proxy-SA 108 can enrich the message as described above.

Regardless of whether Proxy-SA 108 receives the request directly from client computing device 102 or through gateway 106-1, Proxy-SA 108 may check authorization credentials and select a Proxy-ICDAPIA from which to send a request to target 132. To check authorization credentials, Proxy-SA 108 may compare credentials (such as a username and password) received with the proxy request with credentials stored in an authentication database. The authentication database may retain information pertaining to the authentication of the client. Thus, when Proxy-SA 108 receives the request from the client device 102, Proxy-SA 108 may retrieve the client's authentication credentials from database to compare them to the credentials in the request and thus authenticate the client into proxy infrastructure 128. The authentication database may also maintain information pertaining to customer providing the authentication parameters (e.g., client identification, billing information, traffic limits, applied bandwidth limitations, subscription information, status, client passwords, etc.).

In some proxy service implementations, the Proxy-SA 108 monitors bandwidth limits of clients. The authentication database may retain information pertaining to target blacklists and whitelists (i.e., targets that the client device 102 cannot access and can access, respectively). In some embodiments, proxy infrastructure 128 consumes customer traffic information for respected clients and updates current usage for specific clients in the authentication database. When usage exceeds limits for the client, Proxy-SA 108 may deny service. In further embodiments, Proxy-SA 108 may interact with the authentication database to determine whether targets are blocked for the client device 102 or determine whether certain features are enabled for client device 102 (e.g., Quality of Service, or "QoS").

Proxy-ICDAPIAs. To select a Proxy-ICDAPIA, Proxy-SA 108 may coordinate with at least Proxy-ICDAPIA metadata storage 170. Further, optionally, Proxy-SA 108 may access a sticky-section-database to determine whether there is a Proxy-ICDAPIA 130 that has already been selected for a session that the client seeks to send the proxy request for. In this way, when proxy infrastructure 128 receives multiple proxy requests belonging to the same session, proxy infrastructure 128 can use the same Proxy-ICDAPIA 130 for each of them, making the session appear more organic to target 132.

If a client has not defined a session, or the sticky session database does not have a Proxy-ICDAPIA 130 already assigned for a particular session ID, Proxy-SA 108 will coordinate with Proxy-ICDAPIA metadata storage 170 to identify a Proxy-ICDAPIA 130 to use. The Proxy-ICDAPIA metadata storage 170 stores information about each Proxy-ICDAPIA 130 managed by proxy infrastructure 128 in metadata storage 174. The Proxy-ICDAPIA metadata stored in metadata storage 174 could include, for example, the Proxy-ICDAPIA's 130 geographic or topological location, which of several intermediate proxy-SA 108 components within proxy infrastructure 128 the Proxy-ICDAPIA 130 is connected to, and the Proxy-ICDAPIA's 130 IP address. Proxy-ICDAPIA metadata storage 170 can organize Proxy-ICDAPIAs 130 into pools based on geographic location (country-city) and quality.

Using the information stored in metadata storage 174, Proxy-SA 108 requests from Proxy-ICDAPIA metadata storage 170 the best suiting Proxy-ICDAPIA 130 available to service the proxy request from client computing device 102. To make the request, Proxy-SA 108 will send a message to Proxy-ICDAPIA metadata storage 170 with the options selected by the client relating to the desired Proxy-ICDAPIA 130 (such as desired geographic location). In response, a metadata manager 172 of Proxy-ICDAPIA metadata storage 170 will select an appropriate Proxy-ICDAPIA 130 and respond to Proxy-SA 108 with the selected Proxy-ICDAPIA's 130 metadata. The metadata may include an Internet protocol (IP) address of the Proxy-ICDAPIA 130 to route the client request to and an intermediary Proxy-SA 108 that manages the selected Proxy-ICDAPIA 130.

When Proxy-SA 108 receives an indication of the selected Proxy-ICDAPIA 130 from the Proxy-ICDAPIA metadata storage 170, Proxy-SA 108 may store the Proxy-ICDAPIA 130 to be used and a session ID indicated by the user, associated with one another, in sticky session database 116. In this way, Proxy-SA 108 can select to use the same Proxy-ICDAPIAs 130 for subsequent requests in the same session.

Functions of Proxy-Service-Agents. As mentioned above, Proxy-SA 108 may be a group (more than one) physical entity (for example, server) performing functions of Proxy-Service-Agents. There can be such Proxy-SA-function-to-Server optional distributions:

a single physical entity (for example, server) performing several different functions of Proxy-Service-Agents;

several physical entities (servers), each one performing a particular function of Proxy-Service-Agents functions.

Otherwise there can be a single Proxy-Service-Agent function balanced over several physical entities (servers.)

In general, there are no restrictions on how a plurality of Proxy-Service-Agents' 108 different functions (alternative and/or supplementary functions) are distributed over a plurality of physical entities (servers). Such distribution can be any of multiple Proxy-SA 108 functions over a plurality (network or cloud) of physical servers. When the description and Claims refer to Proxy-Service-Agent 108, it is considered as a virtual Proxy-SA 108 function available in the Proxy Infrastructure 128 and Network of ICDAPIAs 130, where such virtual Proxy-SA function 108 provides connectivity, communication, and control thereof between the client's device 102, Proxy-ICDAPIA metadata storage 170, and the plurality of Proxy-ICDAPIAs 130.

In some embodiments, a supplementary/alternative function of a Proxy-SA 108 is a computer component (e.g., a server) that operates as a proxy server on the Internet and serves as an intermediary Proxy-SA 108 to accept requests from the client's device 102 and forward these requests to other proxy servers Proxy-SA 108 and Proxy-ICDAPIAs 130. This supplementary function of a Proxy-SA 108 receives proxy request information from the main Proxy-SA 108, and using specific Proxy-ICDAPIA identification, forwards the received request to the specified Proxy-ICDAPIA 130 via an already established connection. Then, the specified Proxy-ICDAPIA 130 makes a request, sends respective request data to target 132, which may be specified by client computing device 102, and returns a response back to this intermediary Proxy-SA 108, and this intermediary Proxy-SA 108 will send response back to the main Proxy-SA 108.

In some embodiments, a supplementary/alternative function of a Proxy-SA 108 is to determine quickly and efficiently statuses of Proxy-ICDAPIAs 130. For example, the Proxy-SA 108, in making connections between the client device 102 and the Proxy-ICDAPIA 130, may monitor the health (e.g., latency and bandwidth) and status of the connections to determine whether a Proxy-ICDAPIA 130 is still functioning, is off-line, and/or is a new Proxy-ICDAPIA 130. This information may be distributed within the system 100, such that the other modules within the system 100 are aware of the statuses of the Proxy-ICDAPIAs 130.

When an intermediary Proxy-SA 108 corresponds to a Proxy-ICDAPIA 130, the intermediary Proxy-SA 108 manages connections to the Proxy-ICDAPIA 130. To manage connection to a Proxy-ICDAPIA 130, the intermediary Proxy-SA 108 may periodically conduct health checks. For example, the intermediary Proxy-SA 108 may ping the Proxy-ICDAPIA 130, measuring response time. The intermediary Proxy-SA 108 may log response times of the Proxy-ICDAPIA 130. This Proxy-ICDAPIA 130 availability information is set to Proxy-ICDAPIA metadata storage 170, which uses the information to select Proxy-ICDAPIAs to use.

Proxy-ICDAPIA 130 is generally a final proxy server that contacts the target web service 132. The Proxy-ICDAPIA 130 forwards internet traffic from the target 132 to the intermediary Proxy-SA 108. Generally, multiple proxy servers, such as intermediary Proxy-SA servers, may serve requests from the client device 102, forming a "proxy chain", with the Proxy-ICDAPIA 130 being the last link in the chain that ultimately passes the request to the target 132.

The intermediary Proxy-SA is generally operable to register and use the Proxy-ICDAPIAs 130. The intermediary Proxy-SA acts as a router which forwards information to and from Proxy-ICDAPIA 130.

As mentioned above, the intermediary Proxy-SA gathers data on the Proxy-ICDAPIAs 130 that it is connected to and returns that information to Proxy-ICDAPIA metadata storage 170. In an embodiment, intermediary Proxy-SA can send health information to Proxy-ICDAPIAs metadata storage 170.

In some embodiments, Proxy-ICDAPIAs metadata storage 170 is operable to measure performance and attribute history of the Proxy-ICDAPIA 130 to heuristically predict future performance and reliability. The embodiments herein help ensure that the same Proxy-ICDAPIAs 130 can be reserved for a client over time and maximize the efficiency through the use of a Proxy-ICDAPIAs pool. For example, the present embodiments may analyze the history of the Proxy-ICDAPIAs 130 to organize them into pools and then predict their performance and behavior as a group so as to assign the potentially best fitting Proxy-ICDAPIAs 130 for a client. The heuristic prediction can also identify risks associated with connection reliability so that they may be addressed before being assigned to a client. In this way, Proxy-ICDAPIA metadata storage 170 can provide information on the best fitting Proxy-ICDAPIAs to Proxy-SA 108. Various ways on how intermediary Proxy-SA can report information for consumption by main Proxy-SA 108 is described below with respect to figures FIG. 4-7.

Selecting Proxy-ICDAPIA by specifying geographic coordinates. Further, the method and system functions and components for selecting Proxy-ICDAPIA 130 by geographic coordinates are described. The solution is specific by that not only country and city identifiers are used to define geolocation of Proxy-ICDAPIAs. The geographical coordinates for more-than-city-precise allocation are employed, making the solution applicable and efficient in large cities, urban and metropolitan areas, where a lot of target web services 132 and Proxy-ICDAPIAs 130 may be operating. Therefore, selecting the Proxy-ICDAPIA by city name is not sufficient/efficient, as some large city/metropolitan areas may have 20 or 50 miles in radius. In the present solution and proxy service, the user in his request for proxy service defines the geographical coordinates of an area from where he intends to find the most appropriate particular Proxy-ICDAPIA. The geographic coordinates may be used either as independent parameters, or together with the country and city identifiers.

The geographic coordinates of a Proxy-ICDAPIA 130 are not limited to be specified in a variety of geolocation systems, formats, standards and public geographical and topographical services. For example, Global Positioning system (GPS) Open Location Code; Mapcode; ISO 6709; World Geographic Reference System, Google Maps, and many others.

Selecting the Proxy-ICDAPIA 130 by its precise geographical coordinates is possible, if these precise geographical coordinates are known for the client/user in advance. However, much more practical approach is to allow the client/user to define a certain geographical area, in which available Proxy-ICDAPIAs would be searched, and then a selected Proxy-ICDAPIA from the found Proxy-ICDAPIAs' pool (IP-pool) would be returned to the client/user, to reach the target 132.

Making proxy protocol requests. In one of example embodiments, the client may specify a proxy header to select an IP-pool in a specific geolocation:

X-ProxyProvider-Geolocation with value Latitude: Longitude;

Accuracy radius in miles.

Here, the parameter Geolocation defines such a geographical area by 3 numeric parameters: Latitude, Longitude, and Radius, and within this area available Proxy-ICDAPIAs should be searched.

Request example: is provided by the following user's request line:

curl-X pr.ProxyProvider.io: 7777-U "customer-USER-NAME-cc-CA: PASSWORD"—proxy-header "X-ProxyProvider-Geolocation: 49.9235:-97.0811; 10" https://ip.ProxyProvider.io In the above request, an IP from the Canadian pool within 10 miles of the provided coordinates (Latitude 49.9235, Longitude −97.0811) will be selected. It is strongly recommended adding in the request the country parameter (cc flag) to the authorization header, for obtaining the most precise results. Additionally or alternatively, also city identifier—city code or name—can be used (city flag or the same cc flag) in the request. The searched and then selected available IP addresses from the defined geographical area (as above, Canadian pool within 10 miles radius of the provided Lat; Long coordinates) comprise a so-called IP-pool which is used for further refinement, and finally, for selecting a single IP address (Proxy-ICDAPIA address) which further used for providing proxy service.

It should be noted that "Accuracy radius in miles" value, preferably, may not be lower than 10 miles. In one of the embodiments, an example process for matching IP-pool-refinement will be done by following steps:

Select IP-pool by user's provided options (i.e., pre-selection of a temporary IP-pool of candidate Proxy-ICDA-PIAs 130, yet, without checking their geographic coordinates);

For every pre-selected Proxy-ICDAPIAs in the selected IP-pool: calculate the distance between provided central point coordinates X, Y and the x,y-coordinates of every Proxy-ICDAPIA 130 in the selected IP pool. If the x,y-coordinates of an Proxy-ICDAPIA 130 are outside the accuracy radius R specified by the user (in the user's request), then the Proxy-ICDAPIA shall be skipped from the resulting list of the selected Proxy-ICDAPIAs;

Select all proxy ICDAPIA devices 130 which have their distance from the user's specified center point coordinates X, Y less than or equal to R (R is client-provided accuracy radius, e.g., in miles). The preferred range of the accuracy radius R may be selected from 0 to 100 miles, e.g., a preferable value of the radius R may be R=10 miles;

Optionally, further select all Proxy-ICDAPIAs 130 which have their distance from the provided center point coordinates X, Y being more than or equal to the minimum distance R2 (R2 is the additionally defined minimum/exclusion radius. e.g., in miles). The preferred range of the exclusion radius R2 may be selected from 0 to 100 miles, e.g., a most preferred value of the radius R2 may be 5 miles. Also radius R2 is at least 5 miles lower than radius R;

If the selection method finds at least one Proxy-ICDAPIA 130 in this ring-shaped area (defined by X, Y,R2,R), then the method randomly selects one of them (process END);

Otherwise, the selection method selects all Proxy-ICDA-PIAs which are within the additionally defined minimum radius R2, which is e.g., 5 miles;

If the selection method finds at least one Proxy-ICDAPIA 130 from that range within the additional minimum radius R2=5 miles, then it randomly selects one of them (process END);

Otherwise, the selection method returns the 502 HTTP response code (process END).

The geographical x,y-coordinates of all available Proxy-ICDAPIAs 130 can be determined and recorded into the metadata/database (Proxy-ICDAPIA metadata storage 170, Metadata storage 174) by different ways, such as and not limited to:

recorded or corrected manually into the database, specifically, the Metadata storage 174;

defined most roughly by the coordinates of a city where the Proxy-ICDAPIAs are physically allocated;

determined by querying this information directly to the Proxy-ICDAPIAs (130) which may keep it within, as a part of configuration. For example, when a Proxy-ICDAPIA is installed in the data center, one part of its configuration may be defined, at least, the physical address of the datacenter and server room. Which is quite sufficient information to convert it to geographical (GPS) coordinates with the help of Google maps services, or other public geodata services. Indeed, the most initial source for defining the Proxy-ICDAPIA 130 geographical coordinates is the Proxy-ICDAPIA 130 itself;

determined by querying periodically a third party IP geolocation database. Specifically, such a third party IP geolocation database may be the MaxMind IP geolocation database with the Proxy-ICDAPIA's IP, determined by querying periodically, preferably on a daily basis. The database is checked for updates daily, and MaxMind pushes updates about twice weekly, so the local database of the Proxy-ICDAPIAs is never more than 24 h behind the newest updates. However, this means that occasionally there may be discrepancies between us and MaxMind's online geo-checking tool.

Figure 3A:
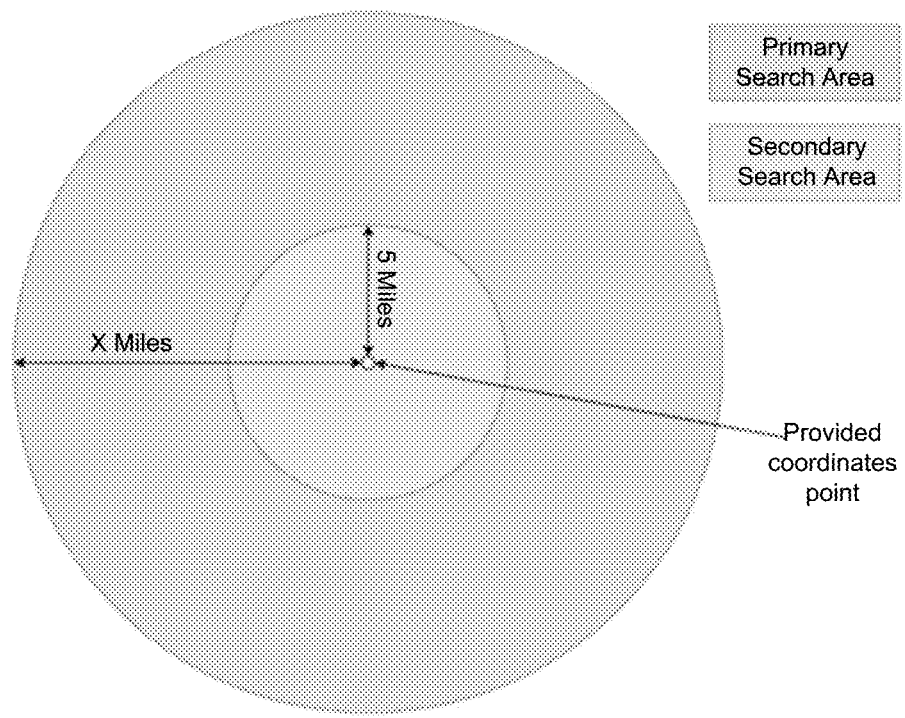
FIGS. 3A-E illustrate embodiments of selecting particular Proxy-ICDAPIA 130 according to the specified geographical coordinates and areas, in particular.

In one of embodiments, presented in FIG. 3A, the Proxy-ICDAPIA selection method operates as follows:

there is some subset of Proxy-ICDAPIAs 130 that have been narrowed down to potentially match the geographic coordinates provided and match other requirements provided by the client, then, the method iterates over these all Proxy-ICDAPIAs, disregarding the ones that are further than radius R and putting the rest Proxy-ICDAPIAs into 2 lists:

A-list, where the Proxy-ICDAPIAs are closer than 5 miles from the center, and

B-list, where Proxy-ICDAPIAs are further than 5 miles from the center, but still closer than radius R, after the method has iterated over all Proxy-ICDAPIAs, if B-list has at least 1 Proxy-ICDAPIA, then the method returns a random one from the B-list, if not and the A-list is not empty, then the method returns a random Proxy-ICDAPIA 130 from the A-list, both A-list and B-list are empty, the method returns an error which will result in an HTTP 502 response to the client.

Figure 3B:
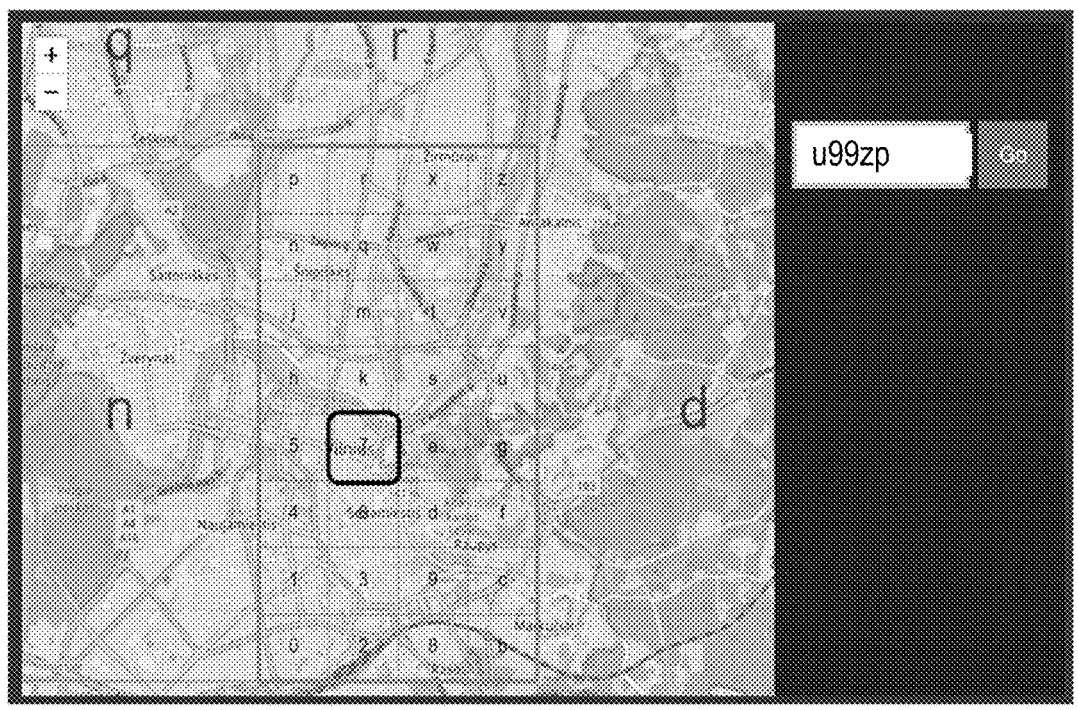

In another example embodiment, depicted in FIG. 3B, the client may specify a proxy header to select an IP-pool in a specific geolocation:

X-ProxyProvider-Geolocation with value Geohash string, or

X-ProxyProvider-Geolocation with value u99zp7

Here, the parameter Geohash string=u99zp7 defines an area described by a specific string of Geohash system. Within this area, available Proxy-ICDAPIAs 130 should be searched, e.g., by the Metadata Manager 172.

Figure 3C:
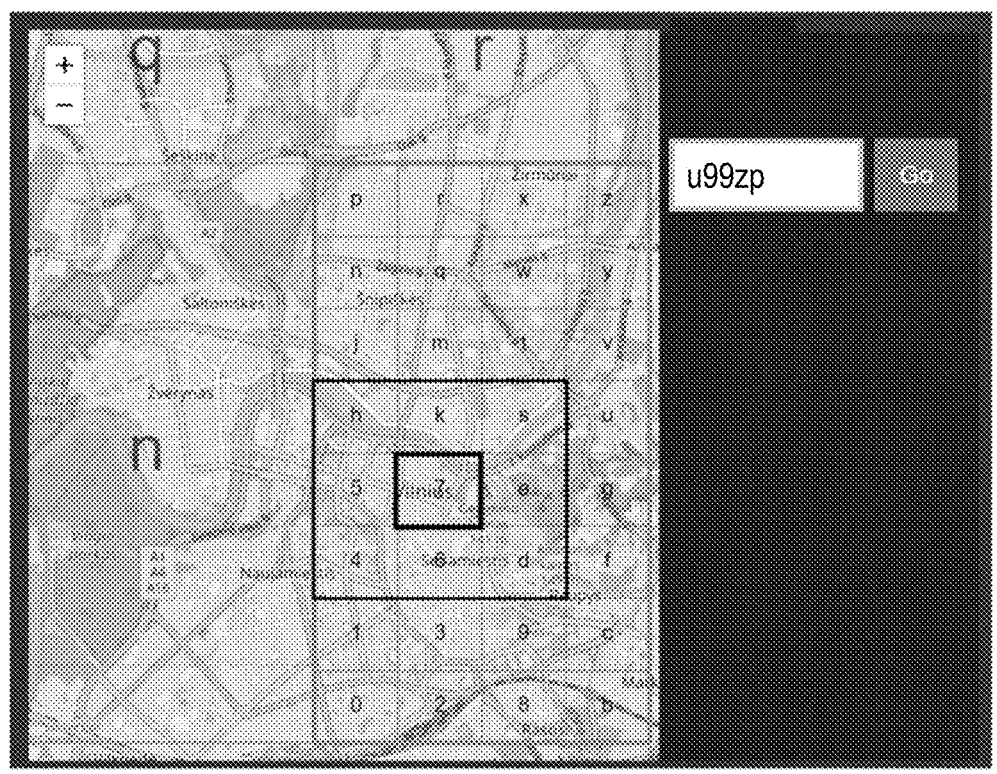

In one more example embodiment, depicted in FIG. 3C, the client may specify a proxy header to select an IP-pool in a specific geolocation:

X-ProxyProvider-Geolocation with value Geohash string; Accuracy level in Geohash or X-ProxyProvider-Geolocation with value u99zp7; u99zp Here, the parameter Geohash string=u99zp7 defines an area described by a specific string of Geohash system. This string also defines a level of the Geohash area. Further, an Accuracy level in Geohash=u99zp parameter may be added, which defines any upper than the Geohash string level, within which the available Proxy-ICDAPIAs may be searched.

Figure 3D:

In one more example embodiment, depicted in FIG. 3D, the client may specify a proxy header to select an IP-pool in a specific geolocation:

X-ProxyProvider-Geolocation with value Geohash string; Accuracy radius in Geohash areas of same level or X-ProxyProvider-Geolocation with value u99zp7; 2

Here, the parameter Geohash string= "u99zp7" defines an area described by a specific string of Geohash system. This string itself also defines a level of the Geohash area. Further, an Accuracy radius in Geohash areas of same level=2 parameter may be added, which defines all neighboring Geohash areas ("u99zp"+4,+5,+h,+k,+s,+e,+d,+6) of same level around the central Geohash string "u99zp7" within those the available proxy ICDAPIA devices may be searched.

The Geohash systems for operating areas and strings can be used by any available public systems, such as Geohash viewer https://geohash.softeng.co/.

Another problem is solved when a client uses a Proxy-ICDAPIA selection by coordinates, is the client's inability to provide a country code in the user's request. The aforementioned functionality of selecting Proxy-ICDAPIA by the geographic coordinates or areas thereof does work without a specified country code, while some countries are not included in the pool used when no parameters are provided. This solution allows creating a certain length of GeoHash pools, then encoding the client's provided coordinates into its own GeoHash to determine the pool (or pools) containing Proxy-ICDAPIAs that match the specified coordinates requirements.

The process of solving the above problem is as follows, and visually presented in FIG. 3E:
- the client sends geo-coordinates, and the proxy service provider's infrastructure 120 checks to which (level 4) GeoHash they fall into;
- the following 2 points deal with cases where the level 4 GeoHash is on the edge of the level 3 GeoHash, because potentially the adjacent level 3 GeoHashes may contain Proxy-ICDAPIAs that match the provided coordinate and radius requirements;
- if the GeoHash is a corner hash, the provider's software forms a pool set with its parent level 3 GeoHash and it's 3 neighbors of that corner (total 4 level 3 GeoHash pools, e.g. if the level 4 GeoHash is in the NW corner, the providers software adds level 3 GeoHash neighbors from W, NW, N).
- If the GeoHash is a side hash, the provider's software forms a pool set with its parent level 3 GeoHash and its neighbor on that side (total 2 level 3 GeoHash pools, e.g., if the level 4 GeoHash on the E side, the provider's software adds level 3 GeoHash neighbors from the East).
- Now, the provider's software has a subset of the entire Proxy-ICDAPIA pool, which allows it to perform Proxy-ICDAPIA refinement by coordinates faster, because the provider's software always iterates over the entire set. This completes the pool selection part of IP refinement by geo-location and then the provider's software carries on as always.

Figure 3E:
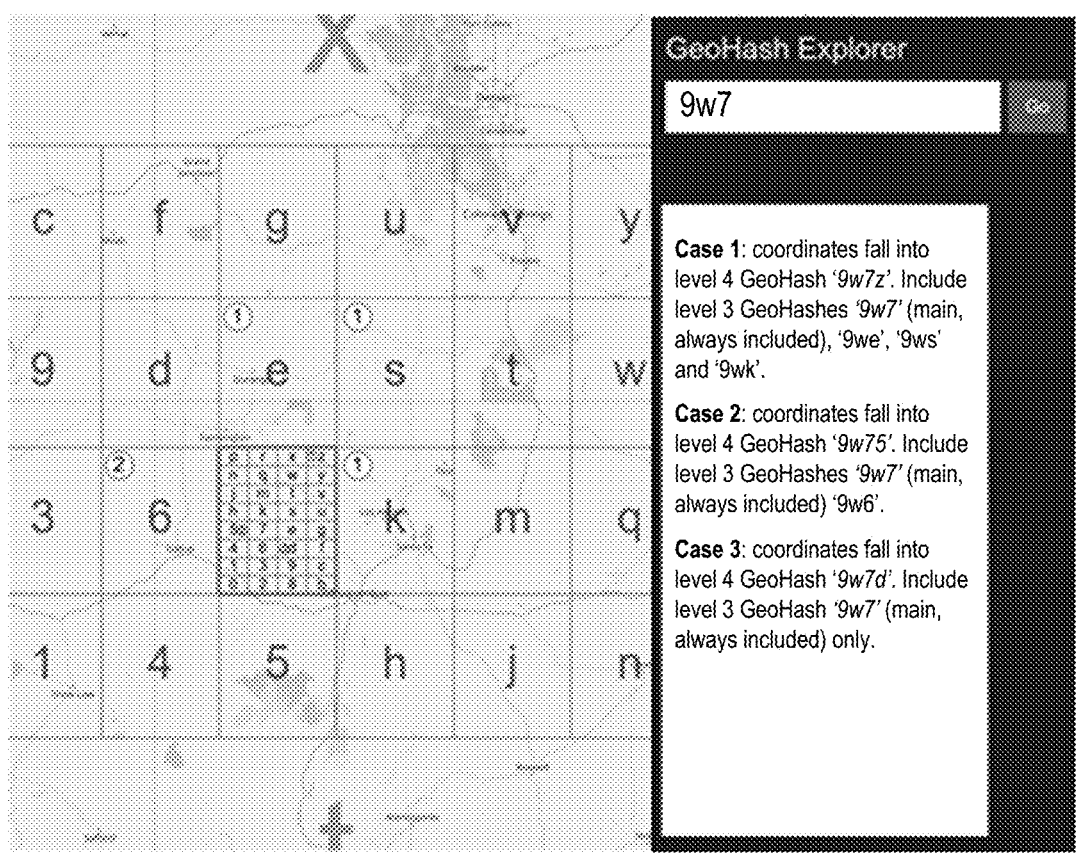

FIG. 3E example provides 3 particular cases of selecting the neighboring Geohash areas for searching available Proxy-ICDAPIAs. Correspondingly, a special Search table may be formed and used for searching available Proxy-ICDAPIAs. This Search table defines which upper-level-Geohashes should be checked in case of any lower-level-Geohash, pointed-out in the client's request for the Proxy service. Each selected Geohash area has 32 lower-level sub-areas within it (X level), and 8 neighboring (X+1 level) around it. The 32 lower-level sub-areas are defined by symbols: p, r, x, z, n, q, w, y, j, m, t, v, h, k, s, u, 5, 7, e, g, 4, 6, d, f, 1, 3, 9, c, 0, 2, 8, b. An exemplary/preferred embodiment of the Search table, referring to FIG. 3E, is provided below.

TABLE 1

| For Geohashes pointed-out in the client's request, at a certain Geohash level X | Which X + 1 level Geohashes are used to Search for available Proxy-ICDAPIAs |
|---|---|
| g, w, m t, k, s, 7, e, 6, d, 3, 9 | Present |
| r, x | Present, Upper |
| 2, 8 | Present, Lower |
| n, j, h, 5, 4, 1 | Present, Left |
| y, v, u, g, f, c | Present, Right |
| z | Present, Upper, Right, and Upper-Right |
| p | Present, Upper, Left, and Upper-Left |
| 0 | Present, Lower, Left, and Lower-Left |
| b | Present, Lower, Right, and Lower-Right |

Table 1 provides one of possible schemes of the Search Table. Nevertheless, the similar schemes may be used in the Search table for searching available Proxy-ICDAPIA nodes.

Figure 2:
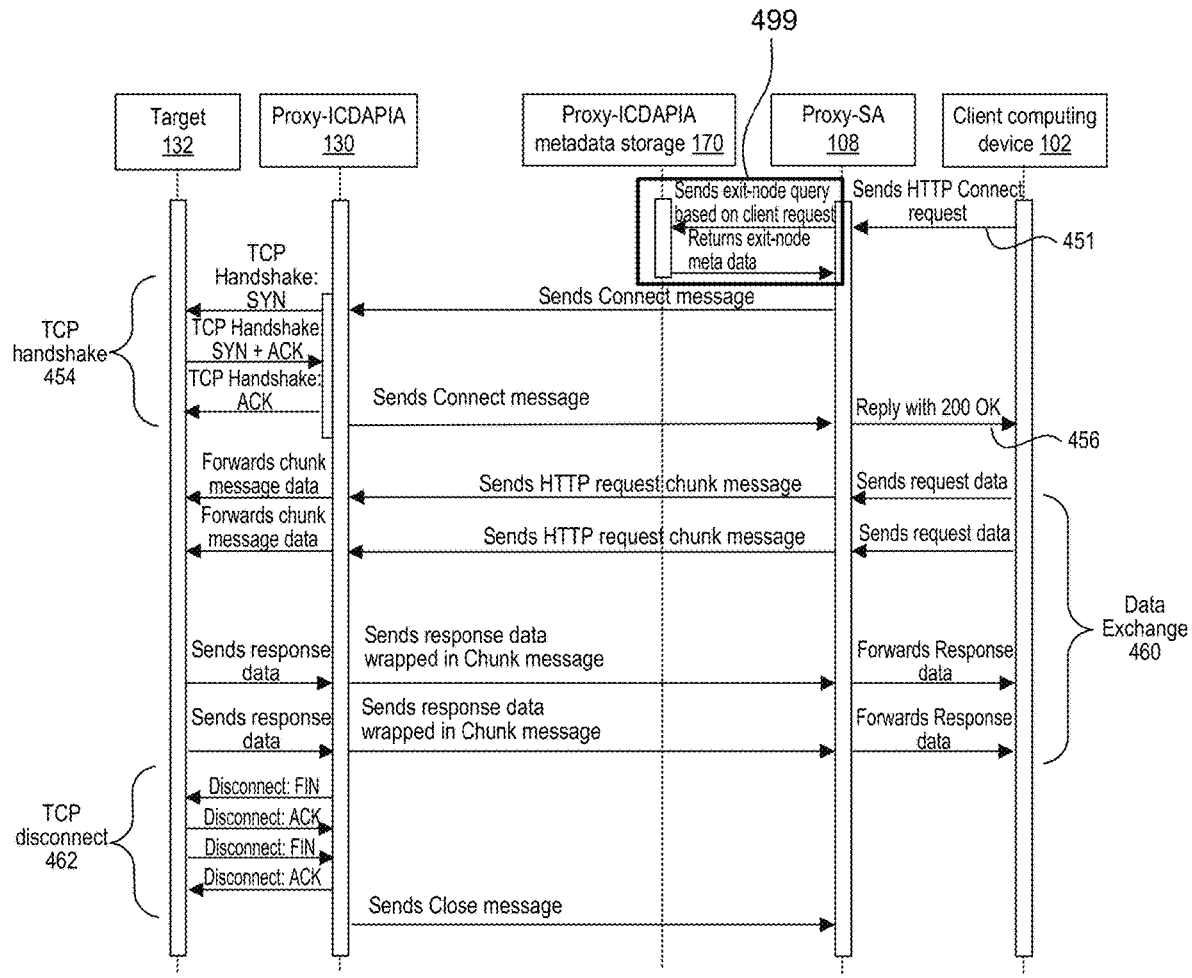
FIG. 2 illustrates an example message flow between components of the proxy infrastructure to service an example HTTP (or HTTPS) request, and the outlined object 499 specifies where the improved and novel scope of the present invention is: selecting a particular Proxy-ICDAPIA 130 according to client's request.

Processing user's request in proxy infrastructure. The user's request in the proxy infrastructure 128 and its system components are processed as described above. FIG. 2 illustrates an exemplary message flow between components of the proxy infrastructure to service an example HTTP (or HTTPS) request. The outlined object 499 specifies where the improved and novel scope of the present invention is: selecting a particular Proxy-ICDAPIA 130 according client's request—the specifics and novelty is using geographical coordinates to select a particular Proxy-ICDAPIA 130. Besides the scope of selecting the Proxy-ICDAPIA 130 by geographical coordinates, the communication through the Proxy service infrastructure 128 follows known exemplary workflow. Client computing device 102 initiates the connection by sending an HTTP connection request to the Proxy-SA 108. In FIG. 2 diagram, this is illustrated as HTTP connect message 451. The Proxy-SA 108 sends a query for Proxy-ICDAPIA 130, based on the client's request, to the Proxy-ICDAPIA metadata storage 170 which in turn, returns Proxy-ICDAPIA metadata to the Proxy-SA 108. The Proxy-SA 108 then sends a connect message to the selected Proxy-ICDAPIA 130. Alternatively, Proxy-SA 108 may send the connect message through intermediary Proxy-SA 108. The Proxy-ICDAPIA 130 then performs a TCP handshake 454 with the target web service 132 to establish the communication session. TCP handshake 454 may involve Proxy-ICDAPIA 130 sending a SYN message to target 132. Target 132 acknowledges the SYN message by returning an ACK message and sends its own SYN message. Finally, Proxy-ICDAPIA 130 replies to the SYN message from target 132 with its own ACK message. Once the communication session is established, the Proxy-ICDAPIA 130 sends a message indicating that the connection is established to Proxy-SA 108. In response, Proxy-SA 108 replies to the client computing device 102 with an OK message, (for example, with code 200 OK message) 456. In this way, only after the TCP session between the target 132 and Proxy-ICDAPIA 130 is established and after an indication that the connection has been established has been forwarded to messenger 108 is the OK message 456 forwarded to client computing device 102. After the OK message, data exchange 460 between client computing device 102 and target 132 can take place. In an example, data exchange 460 may involve a TLS handshake to establish secure, encrypted communication between target 132 and client computing device 102. To complete data exchange 460, client computing device 102 may send request data to the target 132 through the connection which is forwarded as chunk messages to the target 132. The target 132 responds with chunk messages of the requested data to the client computing device 102 until the connection is no longer required. In this regard, the Proxy-ICDAPIA 130 may initiate a disconnect with the target 132, thereby performing TCP disconnect 462 sequence, and ultimately send a close message to the Proxy-SA 108 that closes the connection. If the Proxy-SA does not detect a particular Proxy-ICDAPIA 130 according to the client's request, then it is considered that no Proxy-ICDA-PIA is available at the indicated geographic location. In this case, the HTTP response returned to the client indicates an invalid result (for example, an empty response with HTTP status 502).

Geographical coordinates are considered as an additional criteria/parameter for selecting the particular Proxy-ICDA-PIA 130. Additional means for this purpose are appended/implemented into the Proxy-ICDAPIA storage 174, Metadata Manager 172, and Proxy-ICDAPIA metadata storage 170, Gateway 106-1 and/or Proxy-SA 108.

The Proxy-ICDAPIA metadata storage 170 which stores data records for all available Proxy-ICDAPIAs 130, further comprises data fields for Geographic coordinates of each Proxy-ICDAPIA 130. The x,y-coordinates of every Proxy-ICDAPIA 130 may be stored in any known geo-coordinates formats. Preferable formats of x,y-coordinates are numerical-type Latitude; Longitude and/or character-type Geohash string for each particular Proxy-ICDAPIA 130.

Further, the Metadata manager 172 comprises additional software modules, operating with the geographical coordinate data. These modules are at least but not limited to:

Converters for Geohash string to Latitude/Longitude conversion, and vice-versa;

Proxy-ICDAPIA search modules of different types, which iterate through a preliminary-selected IP-pool of Proxy-ICDAPIAs 130, and identify which pre-selected Proxy-ICDAPIAs 130 fall into the User's requested geographical area accuracy by the Proxy-ICDAPIA's x,y-coordinates.

Random and parametric selectors of a single Proxy-ICDAPIA 130 from several found available ones, for returning the result (particular Proxy-ICDAPIA 130) to the User.

External communication modules which communicate with external sources and databases for keeping up-to-date the x,y-coordinates of all Proxy-ICDAPIAs in the Proxy-ICDAPIA metadata storage 170.

External communication modules which perform conversion of geographical coordinates between various different systems and formats.

Further, the Gateway 106-1 and/or Proxy-SA 108 have to comprise an implemented functionality for parsing the Client message (user's request) line and recognizing in it keywords and parameters related to specified geographical coordinates or geographical areas of preferable Proxy-ICDAPIAs. These geo-coordinate-type keywords and parameters, when recognized in the Gateway 106-1 and/or Proxy-SA 108, afterwards are directed to the Metadata manager 172, which further performs their processing, and finally retrieves from the Proxy-ICDAPIA metadata storage 170 a particular suitable Proxy-ICDAPIA 130 which, together with its IP address, is returned to the Client, for connecting the Client's device 102 to the target web service 132 via the proxy service 128 and that particular Proxy-ICDAPIA 130.

Health Data Storage, including geographical coordinates. While figure FIG. 1 does not differentiate Proxy-SA 108 and intermediary Proxy-SA 108, a person skilled in the art and with a reference to the above description would recognize components may be present in different embodiments. In one example embodiment, FIG. 4, the intermediary Proxy-SA 108 may send metadata directly to Proxy-ICDAPIA metadata storage 170.

Figure 4:
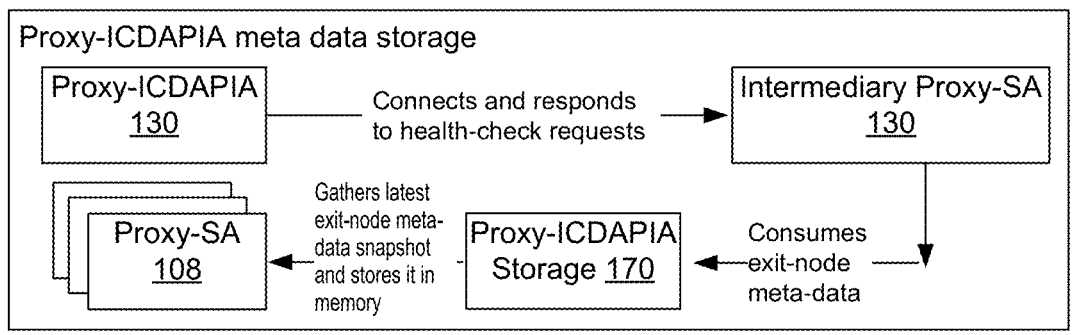

FIG. 4 illustrates Proxy-ICDAPIA 130 reporting its health check information to intermediary Proxy-SA 108 to which it is connected. The intermediary Proxy-SA 108 in turn reports this information to the Proxy-ICDAPIA metadata storage 170 may such that any of the Proxy-SAs 108 within the system 100 can gather the latest Proxy-ICDAPIA metadata as needed and understand the Proxy-ICDAPIA environment.

In another example embodiment, Proxy-ICDAPIA metadata storage 170 may be omitted and Proxy-SA 108 make and consume metadata directly from the intermediary Proxy-SA 108. In this embodiment, Proxy-SA 108 could be managing Proxy-ICDAPIAs directly, as this is illustrated in FIG. 5 and FIG. 6.

Figure 5:
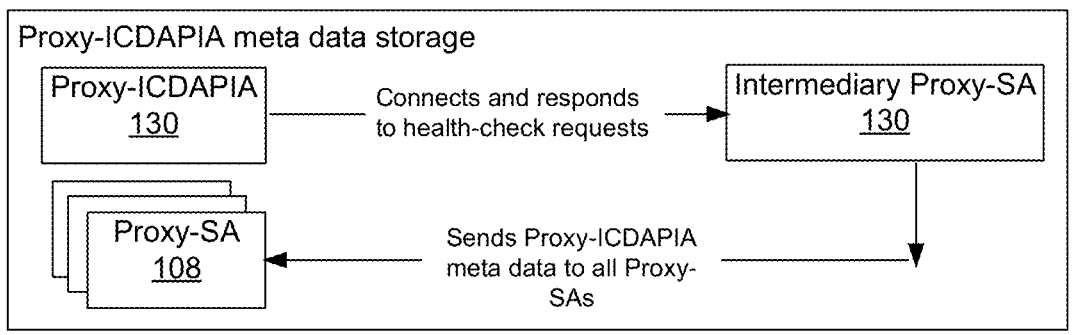

As illustrated in FIG. 5, intermediary Proxy-SA 108 can perform the health checks of the Proxy-ICDAPIA 130 and report the Proxy-ICDAPIA 130 metadata directly to multiple Proxy-SAs 108 within the system 100. Each Proxy-SA 108 may store this information in a cache such that each Proxy-SA 108 understands the Proxy-ICDAPIA 130 environment.

Figure 6:
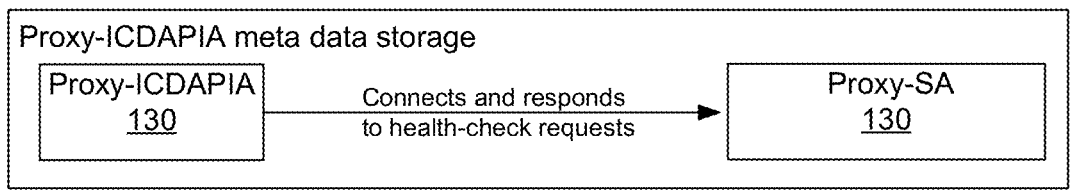

Alternatively, as illustrated in FIG. 6, the Proxy-SA 108 can perform the health checks of the Proxy-ICDAPIA 130 and report the Proxy-ICDAPIA 130 metadata directly to multiple Proxy-SAs 108 within the system 100.

Figure 7:
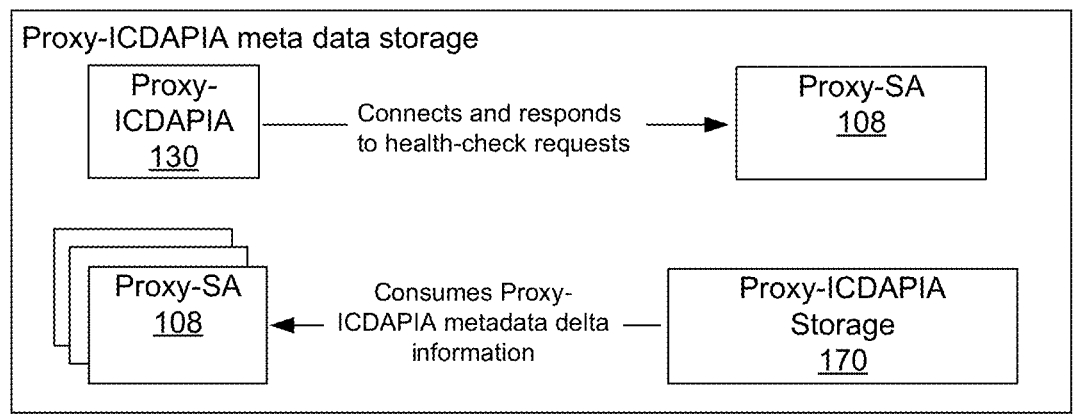

Finally, as illustrated in FIG. 7, intermediary Proxy-SA 108 can perform the health checks of Proxy-ICDAPIA 130 and report the Proxy-ICDAPIA 130 metadata to the Proxy-ICDAPIA metadata storage 170. Proxy-ICDAPIA metadata storage 170 determines a delta representing changes in Proxy-ICDAPIA metadata. Each Proxy-SA 108 may consume the delta information from Proxy-ICDAPIA metadata storage 170, to update its own cache representing the Proxy-ICDAPIA 130 environment.

It is important to note, that in all the above metadata exchanging workflows (FIGS. 4-7) with the Proxy-ICDA-PIAs metadata storage 170 and the Proxy-SAs 108, the geographical x,y-coordinates of any available Proxy-ICDA-PIAs 130 may be introduced and updated in any step or workflow where the update of the x,y-coordinates of any Proxy-ICDAPIA 130 appears to be possible and efficient. The controlling Software of the Proxy service infrastructure 120 can be modified to implement these functionality options in any case.

This application discloses a method of operating a proxy infrastructure, comprising: establishing communication between a plurality of Proxy-Internet-Capable-Devices-with-Assigned-Public-IP-Address (Proxy-ICDAPIAs) and of the proxy infrastructure; receiving, at one of a plurality of Proxy-Service-Agent (Proxy-SA) units of the proxy infrastructure, a proxy protocol request directly from a client computing device, the proxy protocol request specifying a target; in response to the proxy protocol request received in step b.: selecting between one of the plurality of Proxy-ICDAPIAs; and connecting with the target through the selected one of the plurality of Proxy-ICDAPIAs, wherein selecting of Proxy-ICDAPIAs is performed at least according to geographical coordinates or areas thereof specified in the client's proxy protocol request.

The described method discloses that the Proxy-ICDAPIA coordinates are one of geographical coordinate specifications: a. the Proxy-ICDAPIA location degrees and minutes of latitude and longitude in any geographical coordinate system; b. area by a central point coordinates latitude-X, longitude-Y, and the client's accuracy radius R around the central point; c. area by a central point coordinates latitude-X, longitude-Y, and the client's accuracy radius R around the central point, and an additional radius R2 as a search-exclusion radius for a ring-shaped search area, or a secondary area for an additional search; d. GeoHash string, level and area where the Proxy-ICDAPIA is located, or nearest GeoHash cells within user's provided GeoHash deviation tolerance.

The described method discloses that the matching IP-in-pool refinement is done by steps of: a. selecting an IP-pool by provided options in the client's request, wherein said options are at least any one of geographical coordinate specifications; b. searching for every available Proxy-ICDAPIA having its geographical coordinates matching or falling to the geographical coordinate specification of the selected IP-pool; c. selecting Proxy-ICDAPIAs matching or falling to the geographical coordinate specification of the selected IP-pool; d. returning to the client: the connection to the target web service through a single Proxy-ICDAPIA IP address that is further selected from the selected IP-pool, or an invalid result message.

The described method discloses that the geographic coordinates for Proxy-ICDAPIAs are determined by periodically querying a third party IP geolocation database, or by periodically querying the Proxy-ICDAPIAs itself for providing their location geographic x,y-coordinates.

The described method discloses that the geolocation by periodically querying the third party IP geolocation database is provided on a daily basis.

The described method discloses that each of the plurality Proxy-ICDAPIAs is pinged to evaluate responses from each ping; and statistics of the plurality of Proxy-ICDAPIAs based on the evaluations are stored in the database, wherein the selecting occurs based on the stored statistics, wherein the statistics are selected from the geographical coordinates of the plurality of Proxy-ICDAPIAs.

The described method discloses that the proxy protocol request specifies a geographic location and that the selecting occurs based on the geographic location of the Proxy-ICDAPIA, wherein said geographic location of the Proxy-ICDAPIA is specified by geographical coordinates.

The described method discloses that said further geolocation options, additional to said geographical coordinate specification, are any of: continent code, union code, administrative region/unit, country code, city code, state code, postal/ZIP code, ASN code, added to said geographical coordinate specification, those options are further limitations for exclusion or inclusion of Proxy-ICDAPIAs in the selected IP-pool.

The described method discloses that in the step of returning Proxy-ICDAPIAs and IPs, the Proxy-ICDAPIAs and IPs are returned in any of ways or a combination thereof: a. an IP connection to the target web service through the randomly selected single Proxy-ICDAPIA is returned to the user, and, optionally, b. the IP address of said single Proxy-ICDAPIA is returned to the user, or/and c. the service ID of said single Proxy-ICDAPIA within the proxy service infrastructure is returned to the user. The service ID is a unique ID of the Proxy-ICDAPIA.

The described method discloses that in the step of selecting Proxy-ICDAPIAs, further comprises ignoring Proxy-ICDAPIAs if the geographical coordinates of the Proxy-ICDAPIA are inside the defined exclusion radius R2 with respect to the user's central point coordinates X, Y and accuracy radius R. The additionally defined exclusion radius R2 is in the range from 0 to 100 miles, and preferably, is 5 miles, and it is at least 5 miles lower than the user's defined accuracy radius R. The user's defined accuracy radius R is in the range from 0 miles to 100 miles, and preferably, is 10 miles. The user's defined accuracy radius R is a deviation tolerance specified by a Geohash mapping table, wherein said Geohash mapping table defines in which neighboring Geohashes the available ICDAPIAs should be searched for the user's selected central Geohash area.

This application discloses a non-transitory computer-readable device having instructions stored thereon that, when executed by at least one computing device, cause the at least one computing device to perform operations, the operations comprising: a. connecting to a plurality of Proxy-ICDAPIAs of the proxy infrastructure; b. receiving, at one of a plurality of Proxy-Service-Agent (Proxy-SA) units of the proxy infrastructure, a proxy protocol request directly from a client computing device, the proxy protocol request specifying a target; c. in response to the proxy protocol request selecting one of the plurality of Proxy-ICDAPIAs; and e. connecting with the target through the selected one of the plurality of Proxy-ICDAPIAs, wherein selecting of the Proxy-ICDAPIAs is performed according to geographical coordinates or areas thereof specified in the client request.

This application discloses the non-transitory computer-readable device that performs the further operations: a. pinging each of the plurality of Proxy-ICDAPIAs to evaluate responses from each ping; and b. storing statistics of the plurality of proxy providers based on the evaluations, wherein the selecting occurs based on the stored statistics, wherein the statistics are selected from at least one of or combination thereof: i. the geographical coordinates; ii. areas thereof of the plurality of Proxy-ICDAPIAs.

This application discloses the non-transitory computer-readable device where the proxy protocol request specifies a geographic location and wherein the geographic location is specified by geographical coordinates or areas thereof.

This application discloses a system for operating a proxy infrastructure, comprising: a. a plurality of Proxy-Service-Agent (Proxy-SA) units, each Proxy-Service-Agent unit of the plurality of Proxy-SA units configured to receive a proxy protocol request directly from a client computing device, the proxy protocol request specifying a target; b. a plurality of Proxy-ICDAPIAs of the proxy infrastructure, wherein said each Proxy-SA, or optionally, an Auxiliary Proxy-SA, is configured to connect and to handle a connection to the plurality of Proxy-ICDAPIAs, wherein said each Proxy-SA unit is configured to, in response to the proxy protocol request, retrieve a selection of one of the plurality of Proxy-ICDAPIAs, wherein the selected one of the plurality of Proxy-ICDAPIAs connects with the target, wherein the selecting one of the plurality of Proxy-ICDAPIAs is performed according to geographical coordinates or areas thereof, specified in the client request.

The system is disclosed further comprising a database, comprising a pool of records of the plurality Proxy-ICDAPIAs, wherein the database records of each Proxy-ICDAPIA comprise at least one of or combination thereof: a. ID of that Proxy-ICDAPIA; b. IP address of the Proxy-ICDAPIA, where the Proxy-ICDAPIA is available by this IP address for providing proxy service; c. x,y-geographical coordinates of that Proxy-ICDAPIA location, defined at least by Latitude/Longitude, and/or Geohash string.

The system is disclosed, wherein the geographical coordinates of at least two Proxy-ICDAPIAs in the database belong to the same city and said geographical coordinates are different. And wherein the Proxy-SA, or optionally, the Auxiliary Proxy-SA, is configured to ping each of the plurality of Proxy-ICDAPIAs to evaluate responses from each ping, and further comprising a database configured to store statistics of the plurality of Proxy-ICDAPIAs based on the evaluations, wherein the selection of one of the plurality of Proxy-ICDAPIAs occurs based on the stored statistics, wherein the statistics are selected from at least one of or combination thereof: a. the geographical coordinates; b. areas thereof of the plurality of Proxy-ICDAPIAs.

Other clauses. The following clauses below present some embodiments and combinations thereof. Further features from the specification may be combined with one or more of the items.

Proxy servers (e.g., intermediary Proxy-SAs 108, Proxy-ICDAPIAs 130, etc.) can generally be categorized as residential Internet Protocol (IP) proxies, datacenter IP proxies, and mobile IP proxies depending on the functions they provide and/or the servers they employ. For example, a residential IP address is an IP address specifically designated by the owning party that is assigned to a private customer. And, a residential proxy is an IP address linked to a physical device, for example, a mobile phone or a desktop computer. The owner of the residential IP address (e.g., an internet service provider, or "ISP") registers the residential IP addresses in a public database, which allows websites to determine a device's internet provider, network, and/or location. A datacenter IP proxy is a proxy server assigned with a datacenter IP address. Datacenter IP addresses are typically owned by companies, unlike residential IP addresses, and are not typically located in a home. And, a mobile IP proxy may be considered a subset of the residential proxy in that it typically comprises one IP address that is obtained from mobile operators. A mobile IP proxy may use mobile data (e.g., cellular telephony data), as opposed to a residential proxy that uses broadband ISPs or home Wi-Fi.

Each of the modules, servers and other components described above may be implemented on software executed on one or more computing devices or different computing devices.

A computing device may include one or more processors (also called central processing units, or CPUs). The processor may be connected to a communication infrastructure or bus. The computer device may also include user input/output device(s), such as monitors, keyboards, pointing devices, etc., which may communicate with communication infrastructure through user input/output interface(s).

One or more of the processors may be a graphics processing units (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

The computer device may also include a main or primary memory, such as random access memory (RAM). Main memory may include one or more levels of cache. Main memory may have stored therein control logic (i.e., computer software) and/or data.

The computer device may also include one or more secondary storage devices or memory. The secondary memory may include, for example, a hard disk drive, flash storage and/or a removable storage device or drive.

The computing device may further include a communication or network interface. The communication interface may allow a device to communicate and interact with any combination of external devices, external networks, external entities, etc. For example, the communication interface may allow the computer system to access external devices via a network, which may be wired and/or wireless (or a combination thereof), and which may include any combination of LANs, WANs, the Internet, etc.

The computing device may also be any of a rack computer, server blade, personal digital assistant (PDA), desktop workstation, laptop or notebook computer, netbook, tablet, smartphone, smartwatch or other wearable, appliance, part of the Internet-of-Things, and/or embedded system, to name a few non-limiting examples, or any combination thereof.

The computer device may access or host any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in the computing devices may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards. Any of the databases or files described above may be stored in any format, structure, or schema in any type of memory and in a computing device.

In some embodiments, a tangible, non-transitory apparatus or article of manufacture comprising a tangible, non-transitory computer-usable or readable medium having control logic (software) stored thereon may also be referred to herein as a computer program product or program storage device. This includes, but is not limited to, main memory, secondary memory, and removable storage units, as well as tangible articles of manufacture embodying any combination of the foregoing. Such control logic may cause such data processing devices to operate as described herein.

A website is a collection of web pages containing related contents identified by a common domain name and published on at least one web server. A domain name is a series of alphanumeric strings separated by periods, serving as an address for a computer network connection and identifying the owner of the address. Domain names consist of two main elements—the website's name and the domain extension (e.g., .com). Typically, websites are dedicated to a particular type of content or service. A website can contain hyperlinks to several web pages, enabling a visitor to navigate between web pages. Web pages are documents containing specific collections of resources that are displayed in a web browser. A web page's fundamental element is one or more text files written in Hypertext Markup Language (HTML). Each web page in a website is identified by a distinct URL (Uniform Resource Locator). There are many varieties of websites, each providing a particular type of content or service.

Identifiers, such as "(a)," "(b)," "(i)," "(ii)," etc., are sometimes used for different elements or steps. These identifiers are used for clarity and do not necessarily designate an order for the elements or steps.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such as specific embodiments, without undue experimentation, and without departing from the general concept of the present invention. Therefore, such adaptations and modifications are intended to be within the meaning and range of equivalents of the disclosed embodiments based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

A proxy provider (e.g., the owner of a proxy server) can control the quality of proxy services and decide which IP addresses are going to be used for clients in a set of proxies. In some embodiments, if the same proxy server is used for too many requests, the proxy provider may ultimately ban requests from an ISP or to a particular webserver. Additionally, if too many requests come to a webserver from one IP address, then the site may block the requests from that proxy for a predetermined period of time.

Blocking requests often occurs in "web scraping". Web scraping is generally the automated gathering of data from the internet. Web scraping is usually accomplished with a software program that queries a web server and requests data automatically. The web scraping software (a.k.a., web scrapers) then parses the retrieved data to extract the requested information.

Web scrapers advantageously collect and process large amounts of data. For example, rather than a client opening one page at a time through a web browser, a web scraper can view a large database comprising thousands or even millions of pages at once. Web scraping typically involves retrieving Hypertext Markup Language (HTML) data from a website, parsing the data for target information, and saving the target information. Web scrapers can also be used for streaming video. For example, a web scraper may retrieve content from one or more webservers to fill a playout buffer so that a client can begin playing from the buffer. Web crawling (via a software tool known as a "web crawler" or a "web spider"), on the other hand, simply retrieves raw HTML data from a website and indexes that data for subsequent expedited access.

Some websites, however, prevent or reduce access by web scrapers and web crawlers as they can overwhelm the websites. For example, a web server may identify "bot-like" behavior and then identify the IP address of a web scraper. After identifying the IP address of the web scraper, the web server may block the web scraper from subsequent access.

Recognizing the bot-like behavior can be done in multiple ways. One approach involves observing a rate of actions over time, since humans normally perform less actions than a bot would. Sophisticated web scrapers, however, may choose to employ proxies which mask the real IP address of the web scraper. The web scrapers may thus operate through multiple IP addresses at the same time to increase performance and to avoid being blocked.

Proxy providers can be confronted with issues relating to web scraping and streaming activities. For web scraping, proxy providers try to provide a client with Proxy-ICDAPIAs 130 that have a lower probability of being blocked. For streaming, proxy providers try to ensure that Proxy-ICDAPIAs 130 are reliable and fast. If a Proxy-ICDAPIA 130 disconnects during a session, a client typically has to reconnect to the streaming service.

It should also be noted that the various components of the system 100 in this exemplary embodiment may be more numerable than shown and spread out over many geographic locations across the globe. Moreover, the individual components of the system may be implemented as individual servers, as multiple servers, and/or even as portions of a server's overall computing/networking capacity. Thus, for the purposes of simplicity and to aid the reader in understanding the embodiments herein, the system is illustrated with one client device 102 communicating with one target 132.

Any of the above embodiments herein may be rearranged and/or combined with other embodiments. Accordingly, the invention is not to be limited to any particular embodiment disclosed herein. Additionally, the invention can also take the form of an entirely hardware embodiment or an embodiment containing both hardware and software elements.

What is claimed is:

1. A method of operating a proxy infrastructure, comprising:
   (a) establishing communication between the proxy infrastructure and a plurality of Proxy-Internet-Capable-Devices-with-Assigned-Public-IP-Address (Proxy-ICDAPIAs), each of the plurality of Proxy-ICDAPIAs comprising a proxy server assigned with a public Internet Protocol address, the proxy infrastructure comprising a plurality of proxy service agents (Proxy-SAs);
   (b) receiving, at one of the plurality of Proxy-SAs, a proxy protocol request directly from a client computing device, the proxy protocol request specifying a target and a geographic location for a request to the target to originate from, wherein the geographic location is specified by geographical coordinates;
   in response to the proxy protocol request received in (b):
   (c) based on the specified geographic location, selecting one of the plurality of Proxy-ICDAPIAs and ignoring a Proxy-ICDAPIA of the plurality of Proxy-ICDAPIAs when the geographical coordinates of the ignored Proxy-ICDAPIA are inside a defined exclusion radius R2 with respect to central point coordinates X,Y and accuracy radius R for the client computing device originating the proxy protocol request, wherein the defined exclusion radius R2 is in a range from 0 to 100 miles and is at least 5 miles lower than the accuracy radius R; and
   (d) connecting with the target through the selected one of the plurality of Proxy-ICDAPIAs such that the connection appears to the target to originate from the specified geographic location.

2. The method of claim 1, wherein the geographic location is further specified in the proxy protocol request by at least one of:

(i) a Proxy-ICDAPIA location in degrees and minutes of latitude and longitude in any geographical coordinate system;
(ii) an area by central point coordinates, including a latitude-X, a longitude-Y, and the accuracy radius R around a central point, the accuracy radius R specified by the proxy protocol request;
(iii) an area within the central point coordinates and the accuracy radius R around the central point, but outside another area around the central point coordinates and with an additional radius R2 to form a ring-shaped search area, wherein the selecting (c) selects a Proxy-ICDAPIA in the other area when a Proxy-ICDAPIA is unavailable in the area (iii); and
(iv) a GeoHash string where the selected Proxy-ICDAPIA is located, or nearest GeoHash cells within a GeoHash deviation tolerance for a client.

3. The method of claim 2, wherein the selecting (c) comprises:
based on options in the proxy protocol request, selecting an IP-pool representing a group of IP addresses having a common criteria selected by the options; and
selecting, from the plurality of Proxy-ICDAPIAs in the selected IP-pool, at least one available Proxy-ICDAPIA such that the selected available Proxy-ICDAPIA has geographical coordinates matching or falling to a geographical coordinate specification of the selected IP-pool, and further comprising:
when no Proxy-ICDAPIA is available at the geographic location, returning to the client an invalid result message.

4. The method of claim 1, further comprising determining geographical coordinates for the plurality of Proxy-ICDAPIAs (i) by periodically querying a third party IP geolocation database, or (ii) by periodically querying the plurality of Proxy-ICDAPIAs itself for providing their location geographic X,Y-coordinates.

5. The method of claim 4, wherein determining the geographical coordinates comprises periodically querying the third party IP geolocation database on a daily basis.

6. The method of claim 1, further comprising:
(e) pinging each of the plurality of Proxy-ICDAPIAs to evaluate responses from each ping; and
(f) storing statistics of the plurality of Proxy-ICDAPIAs based on the evaluated responses,
wherein the selecting (c) occurs based on the stored statistics,
wherein the stored statistics are selected from geographical coordinates of the plurality of Proxy-ICDAPIAs.

7. The method of claim 1, wherein the geographic location is additionally specified by any of: continent code, union code, administrative region/unit, country code, city code, state code, postal/ZIP code, ASN code, added to a geographical coordinate specification, those options are further limitations for exclusion or inclusion of the plurality of Proxy-ICDAPIAs in the selected IP-pool.

8. The method of claim 1, wherein the connecting (d) comprises returning, to a client that originated the proxy protocol request, an IP connection to the target through the selected Proxy-ICDAPIA, the IP connection comprising a response header in a connect message, the response header comprising information about the selected Proxy-ICDAPIA, wherein the information about the selected Proxy-ICDAPIA is an IP address or a service ID of the selected Proxy-ICDAPIA.

9. The method of claim 1, wherein the accuracy radius R is in a range from 0 miles to 100 miles.

10. The method of claim 9, wherein the accuracy radius R is a deviation tolerance specified by a Geohash mapping table, wherein the Geohash mapping table defines neighboring Geohashes and available Proxy-ICDAPIAs to be searched for a central Geohash area selected by a client originating the proxy protocol request.

11. A non-transitory computer-readable device having instructions stored thereon that, when executed by at least one computing device, cause the at least one computing device to perform operations, the operations comprising:
(a) establishing communication between a proxy infrastructure and a plurality of Proxy-Internet-Capable-Devices-with-Assigned-Public-IP-Address (Proxy-ICDAPIAs), each of the plurality of Proxy-ICDAPIAs comprising a proxy server assigned with a public Internet Protocol address, the proxy infrastructure comprising a plurality of proxy service agents (Proxy-SAs);
(b) receiving, at one of the plurality of Proxy-SAs, a proxy protocol request directly from a client computing device, the proxy protocol request specifying a target and a geographic location for a request to the target to originate from, wherein the geographic location is specified by geographical coordinates;
in response to the proxy protocol request received in (b):
(c) based on the specified geographic location, selecting one of the plurality of Proxy-ICDAPIAs and ignoring a Proxy-ICDAPIA of the plurality of Proxy-ICDAPIAs when the geographical coordinates of the ignored Proxy-ICDAPIA are inside a defined exclusion radius R2 with respect to central point coordinates X,Y and accuracy radius R for the client computing device originating the proxy protocol request, wherein the defined exclusion radius R2 is in a range from 0 to 100 miles and is at least 5 miles lower than the accuracy radius R; and
(d) connecting with the target through the selected one of the plurality of Proxy-ICDAPIAs such that the connection appears to the target to originate from the specified geographic location.

12. The non-transitory computer-readable device of claim 11, wherein the operations further comprise:
(e) pinging each of the plurality of Proxy-ICDAPIAs to evaluate responses from each ping; and
(f) storing statistics of the plurality of Proxy-ICDAPIAs based on the evaluated responses,
wherein the selecting (c) occurs based on the stored statistics,
wherein the stored statistics are selected from geographical coordinates of the plurality of Proxy-ICDAPIAs.

13. A system for operating a proxy infrastructure, comprising:
a plurality of Proxy-Service-Agent (Proxy-SA) units, each Proxy-Service-Agent unit of the plurality of Proxy-SA units configured to receive a proxy protocol request directly from a client computing device, the proxy protocol request specifying a target and a geographic location for a request to the target to originate from, wherein the geographic location is specified by geographical coordinates; and
a plurality of Proxy-Internet-Capable-Devices-with-Assigned-Public-IP-Address (Proxy-ICDAPIAs) of the proxy infrastructure;
wherein each Proxy-SA unit is configured to connect and to handle a connection to the plurality of Proxy-ICDAPIAs,
wherein each Proxy-SA unit is configured to, in response to the proxy protocol request, retrieve a selection of one of the plurality of Proxy-ICDAPIAs and ignore one of the plurality of Proxy-ICDAPIAs, wherein the selected one of the plurality of Proxy-ICDAPIAs connects with the target, wherein the selecting one of the plurality of Proxy-ICDAPIAs is performed according to the geographical coordinates specified in the proxy protocol request, and wherein the ignored one of the plurality of Proxy-ICDAPIAs has geographical coordinates inside a defined exclusion radius R2 with respect to central point coordinates X,Y and accuracy radius R for the client computing device originating the proxy protocol request, wherein the defined exclusion radius R2 is in a range from 0 to 100 miles and is at least 5 miles lower than the accuracy radius R.

14. The system of claim 13, further comprising a database comprising a pool of records of the plurality of Proxy-ICDAPIAs, wherein the records of each of the Proxy-ICDAPIAs comprise at least one of or combination thereof:
    an ID of the Proxy-ICDAPIA,
    an IP address of the Proxy-ICDAPIA, wherein the Proxy-ICDAPIA is available by the IP address for providing proxy service, and
    X, Y-geographical coordinates of a location of the Proxy-ICDAPIA, wherein the X, Y-geographical coordinates are defined at least by Latitude/Longitude, and/or Geohash string.

15. The system of claim 13, wherein the geographical coordinates of at least two Proxy-ICDAPIAs in a database belong to a same city and the geographical coordinates are different.

16. The system of claim 13, wherein the Proxy-SA is configured to ping each of the plurality of Proxy-ICDAPIAs to evaluate responses from each ping, and further comprising a database configured to store statistics of the plurality of Proxy-ICDAPIAs based on the evaluated responses, wherein the selecting of one of the plurality of Proxy-ICDAPIAs occurs based on the stored statistics, and wherein the stored statistics are selected from at least one of or combination thereof: a. the geographical coordinates; b. areas thereof of the plurality of Proxy-ICDAPIAs.

17. A method of operating a proxy infrastructure, comprising:
    (a) establishing communication between the proxy infrastructure and a plurality of Proxy-Internet-Capable-Devices-with-Assigned-Public-IP-Address (Proxy-ICDAPIAs), each of the plurality of Proxy-ICDAPIAs comprising a proxy server assigned with a public Internet Protocol address, the proxy infrastructure comprising a plurality of proxy service agents (Proxy-SAs);
    (b) receiving, at one of the plurality of Proxy-SAs, a proxy protocol request directly from a client computing device, the proxy protocol request specifying a target and a geographic location for a request to the target to originate from, wherein the geographic location is specified by geographical coordinates;
    in response to the proxy protocol request received in (b):
    (c) based on the specified geographic location, selecting one of the plurality of Proxy-ICDAPIAs and ignoring a Proxy-ICDAPIA of the plurality of Proxy-ICDAPIAs when the geographical coordinates of the ignored Proxy-ICDAPIA are inside a defined exclusion radius R2 with respect to central point coordinates X, Y and accuracy radius R for the client computing device originating the proxy protocol request, wherein the accuracy radius R is in a range from 0 miles to 100 miles; and
    (d) connecting with the target through the selected one of the plurality of Proxy-ICDAPIAs such that the connection appears to the target to originate from the specified geographic location.

18. The method of claim 17, wherein the accuracy radius R is a deviation tolerance specified by a Geohash mapping table, wherein the Geohash mapping table defines neighboring Geohashes and available Proxy-ICDAPIAs to be searched for a central Geohash area selected by a client originating the proxy protocol request.

* * * * *